United States Patent [19]
Olson

[11] Patent Number: 5,261,117
[45] Date of Patent: Nov. 9, 1993

[54] METHOD TO ALLOW A RADIO TRANSCEIVER TO AUTOMATICALLY SELECT FROM AMONGST MULTIPLE RADIO SYSTEMS

[75] Inventor: Carl B. Olson, San Carlos, Calif.

[73] Assignee: Motorola, Inc., Schaumburg, Ill.

[21] Appl. No.: 845,161

[22] Filed: Mar. 27, 1986

Related U.S. Application Data

[63] Continuation-in-part of Ser. No. 687,104, Dec. 28, 1984, abandoned.

[51] Int. Cl.⁵ .............................................. H04Q 7/00
[52] U.S. Cl. .................................. 455/34.1; 455/54.2; 455/56.1; 455/166.2; 379/58
[58] Field of Search ............... 455/32.1, 33.1, 33.2, 455/33.4, 34.1, 17, 54.1, 54.2, 56.1, 76, 77, 166.2; 379/58

[56] References Cited

U.S. PATENT DOCUMENTS

| | | | |
|---|---|---|---|
| 4,360,927 | 11/1982 | Bowen et al. | 455/54.1 |
| 4,534,061 | 8/1985 | Ulug | 455/17 |
| 4,553,262 | 11/1985 | Coe | 455/34.1 |
| 4,672,601 | 6/1987 | Ablay | 455/54.2 |

OTHER PUBLICATIONS

Motorola ® Systems Saber ® FM Portable Radio Jan. 1, 1990.

Primary Examiner—Jin F. Ng
Assistant Examiner—Philip J. Sobutka
Attorney, Agent, or Firm—Steven G. Parmelee

[57] ABSTRACT

A method and means of automatically accessing several types of radio systems is described. The present invention allows a subscriber unit, which is normally operative in a operator selected radio system, to establish communication with an alternate system if a operator selected system cannot be found. The alternate system may be a conventional single channel mobile relay system or trunked radio system in which the subscriber is authorized to operate. Once communications are established with an alternate communication system, the present invention will periodically attempt to establish communication with the operator selected system while simultaneously attempting to be assigned a higher priority channel in the alternate communication systems according to a priority scan list. Further, the present invention will automatically ignore certain channels which are dedicated for car-to-car use.

5 Claims, 6 Drawing Sheets

METHOD TO ALLOW A RADIO TRANSCEIVER TO AUTOMATICALLY SELECT FROM AMONGST MULTIPLE RADIO SYSTEMS

CROSS REFERENCE TO RELATED APPLICATIONS

This application is a continuation-in-part application based on U.S. patent application Ser. No. 687,104, filed Dec. 28, 1984, now abandoned.

FIELD OF THE INVENTION

This invention relates generally to the field of trunked radio systems and specifically to a method and means for automatically maintaining communications with a trunked or conventional mobile relay system as the mobile or portable unit moves from the radio coverage of one system to the radio coverage of another.

BACKGROUND OF THE INVENTION

Trunked radio systems have developed as a means of increasing user mobile or portable units capacity in systems which operate in a fixed geographic area. In the past, a typical system was comprised of either a conventional mobile relay system or a single site trunked system.

A conventional mobile relay system may be comprised of a full duplex transceiver, receiving and transmitting the audio signal to a fleet of mobile or portable units operating on the reverse pairing of those frequencies. This provides extended unit to unit coverage within the coverage area of the mobile relay. The capacity of a mobile relay system is severely limited by the number of users and the frequency and length of particular calls.

Trunked systems alleviate the constraints of a single mobile relay system by operating on several alternative frequency pairs, and communications between units is done on channels which are dynamically assigned to them by a control unit on a separate control channel pair. In effect, trunking systems provide for automatic channel assignment in a mobile or portable radio. Trunked radio systems improve both spectral efficiency and operating characteristics of land mobile radio systems.

Coverage from a given radio site is limited by Federal Communications Commission rules and regulations which require reducing the effective radiated power output of the mobile relay or trunked transmitter as the height above the average terrain is increased. This, in conjunction with local terrain and buildings, results in limited coverage from a single site.

Increasing the amount of coverage may be accomplished by constructing additional trunked systems or mobile relays on additional sites to provide coverage in the desired areas. The selection of another trunked system or a mobile relay is an economic one, based on the coverage desired and the number of units that will be served by the coverage of the additional site(s). Additionally, the FCC has loading standards, measured in units per frequency pair, so that providing too many frequency pairs can put a system operator at risk of losing exclusive use of their frequency pairs.

The selection of single mobile relays to "fill in" trouble spots is the best selection but suffers from a loss of system discipline as the unit operator has been tasked with the manual selection of the correct trunked or mobile relay system as they travel through the territory covered by the combination of trunked systems and mobile relays.

SUMMARY AND OBJECTS OF THE INVENTION

Briefly described, the present invention contemplates a method and means of automatically establishing communication on an available communications channel in an area having a plurality of trunked and conventional communications systems. According to the principles of the present invention, a communicaton channel is established by searching for a communication channel on the preferred home trunked or conventional system, and remaining on that channel if one can be found. If a prime channel cannot be found, the mobile unit searches for an alternate channel according to a prearranged scan list. The mobile unit then locks onto the alternate channel if the alternate repeater responds with an acknowledgement when interrogated. The mobile unit periodically attempts to reestablish communications on the preferred home system on a periodic basis; and simultaneously attempts to be assigned a higher priority channel on the alternate communication system if a channel on the home system cannot be found.

Accordingly, it is an object of the present invention to provide a method and means of expanding the range of a trunked system subscriber unit by providing the ability to seek out alternate communication systems.

It is another object of the present invention to provide a method for automatically selecting the highest priority communication channel available to a suscriber unit.

It is still another object of the present invention to provide a method and means of preventing the total loss of communications in a subscriber unit due to the unavailability of a prime communication channel.

It is yet another object of the present invention to provide a mobile subscriber unit which is compatible with plurality of communications systems.

DETAILED DESCRIPTION OF THE DRAWINGS

Figure 1A:
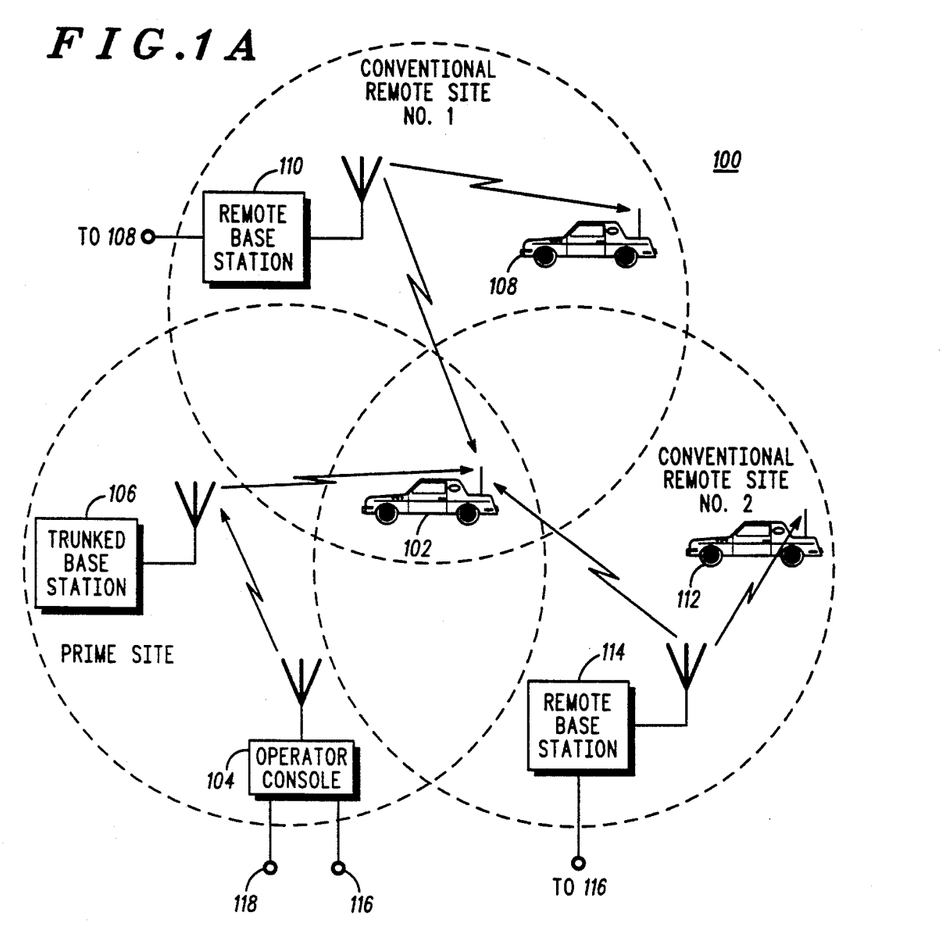
FIG. 1A is a drawing depicting the use of the present invention over a wide geographic area having several communication systems.

FIG. 1 represents a three site system consisting of a trunked system 106 and two mobile relay systems 110 and 114. Three different mobiles 102, 108 and 112 are also shown. The two mobile relays 110 and 114 transmit and receive their audio from a central dispatch point, 104 via telephone circuits 116 and 118. These relays could alternatively be served by other carrier circuits such as microwave or fiber optics; or a configuration using remote controlled control stations. Mobile 108 may be typically operating in the coverage area of mobile relay 110. Mobile 112 may be typically operating in the coverage area of mobile relay 114. Mobile 102 may be operating in the overlap area of all three systems, 106, 110 and 114.

Figure 1B:
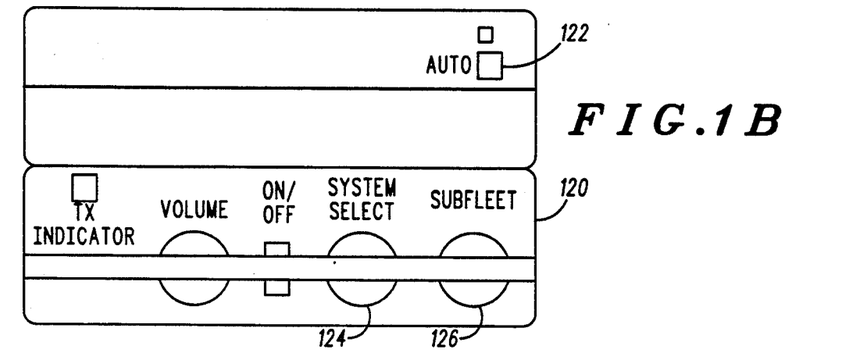
FIG. 1B is a diagram of the control panel of a mobile radio of the type which may advantageously utilize the method of the present invention.

FIG. 1B represents a control panel of a mobile radio of the type which may advantageously utilize the method of the present invention. According to the principles of the present invention, mobile 102 may automatically operate on system 106 of FIG. 1A by selecting the automatic mode 122 on the mobile unit control head 120 of FIG. 1B and by selecting a trunking position of selector switch 124. The control head 120 of FIG. 1B is the user interface portion of mobile unit 102 of FIG. 1A, and is typically installed in a location which is convenient to the user. The bulk of the electronic circuitry is typically disposed in a remote location to conserve space within the vehicle. Referring now to FIG. 1A, as the mobile unit 102 moves out of the system 106 to the coverage area of system 110, the mobile unit 102 will transfer to the frequency pair of system 110. The mobile 102 will transfer to system 114 as it leaves the coverage area of 106 and 110. In the common overlap area of 110 and 114 which does not share any overlap with system 106, the mobile unit 102 will operate on the system which is highest in priority in the search list; i.e. remote site 110.

Mobile unit 102 will operate on only the mobile relay systems 110 or 114 if conventional only operation is selected on system selector 124 of FIG. 1B, and the system of operation will be determined according to a prearranged search list. Mobile unit 102 will be manually locked to the operator's selection if the automatic selector, 122 of FIG. 1B, is turned off. A system subfleet selector switch, 126 of FIG. 1, selects the subfleet for trunking system operation only. If more than one trunked system is being searched for, only the preprogrammed subfleet will be searched for except on the trunked system that is selected by 124 which will search for the subfleet selected by 126.

Conventional repeater systems are well known. A complete technical description of a conventional repeater system may be found in Motorola Instruction Manual 68P81025E60 entitled "Micor Base and Repeater Station". Similarly, a complete technical description of a trunked radio system which may be used advantageously with the teachings of the present invention may be found in Motorola Instruction Manual 68P81066E60 entitled "Trunked System Central Controller." This and the abovementioned manuals are available from the technical writing services department of Motorola Inc., 1301 E. Algonquin Rd., Schaumburg Il., 60196, and are herein incorporated by reference as if fully set forth herein.

Figure 2:
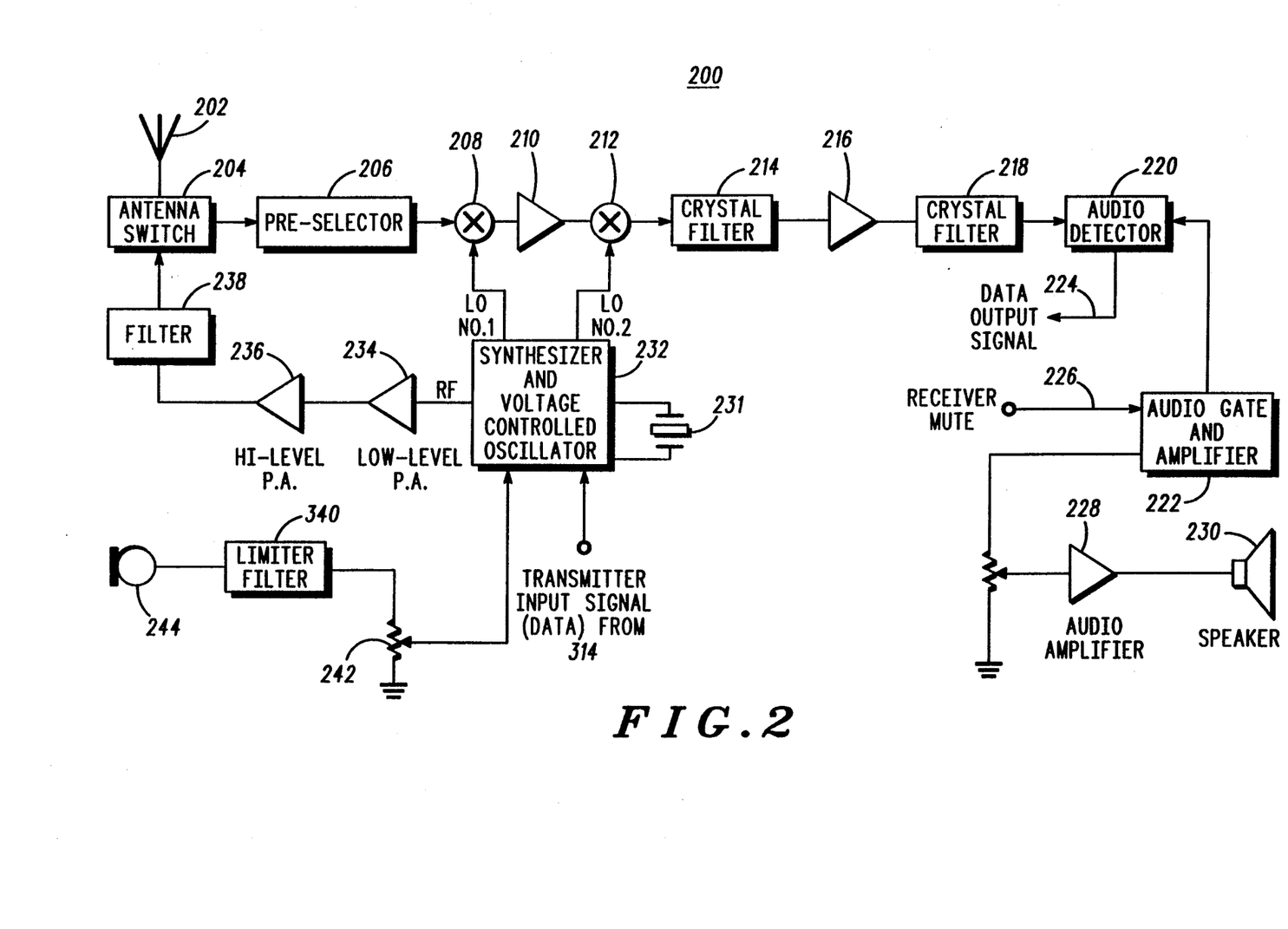
FIG. 2 is a schemaic diagram of a mobile receiver of the type which may advantageously utilize the method of the present invention.

Referring now to FIG. 2, there is shown a schematic and block diagram of the receiving portion of a mobile unit which may be used advantageously with the teachings of the present invention. The transceiver of FIG. 2 may be constructed with any of several well known receiver components and many transceiver configurations would function satisfactorily in accordance with the teachings of the present invention. In the transceiver of FIG. 2, an R.F. signal is received and transmitted through antenna 202 which is coupled to an antenna switch 204. The antenna switch selectively couples signals to the antenna depending on the operational mode of the transceiver 200. Received signals are coupled from the antenna switch 204 to a preselector 206 which provides the primary stage of filtering the R.F. signal for a desired frequency. The output of preselector 206 is coupled to a dual conversion frequency converter formed by mixers 208 and 212 and amplifier 210. A synthesizer circuit 232 controls the frequency which is recovered by the frequency converter by controlling the voltage controlled oscillator for the injection frequency of mixer 208. The synthesizer 232 would typically be referenced to a high stability oscillator 231. The injection signal of a second mixer 212 may also be provided by oscillator 231 through multiplier circuitry contained in synthesizer 232. Additional filtering of the received signal is provided by crystal filters 214 and 218. Amplifier 216 compensates for signal losses caused by previous receiver circuitry.

The audio output circuitry of transceiver 200 is formed by audio detector 220, an audio gate and preamplifier circuit 222, and an output amplifier 228 and speaker 230. The output of crystal filter 218 provides a signal suitable for further processing by the remainder of the audio output circuitry. In addition to audio processing, the audio detector 220 also recovers data from the received and filtered signal and provides the data signal to be used by the processing portion of transceiver 200. A squelch circuit (not shown) generates a receiver mute signal 226 which disables the audio output of receiver 200 in the absence of an acceptable signal.

The transmitter portion of the transceiver 200 is formed by a microphone 244 which is coupled to audio processing circuitry 242. The processed audio signal is then applied to the synthesizer 232 through a level adjuster 242. The R.F. output of synthesizer is then coupled to the antenna switch 204 through R.F. amplifiers 234, 236 which convert the R.F. signal to a suitable power level. A transceiver suitable for use in accordance with the teachings of the present invention is described in detail in Motorola instruction manual no. 68P81043E50 entitled "Trunked Syntor X mobile radio" available from the technical writing services department of Motorola Inc., 1301 E. Algonquin Rd., Schaumburg Ill., 60196, said manual herein incorporated by reference.

Figure 3:
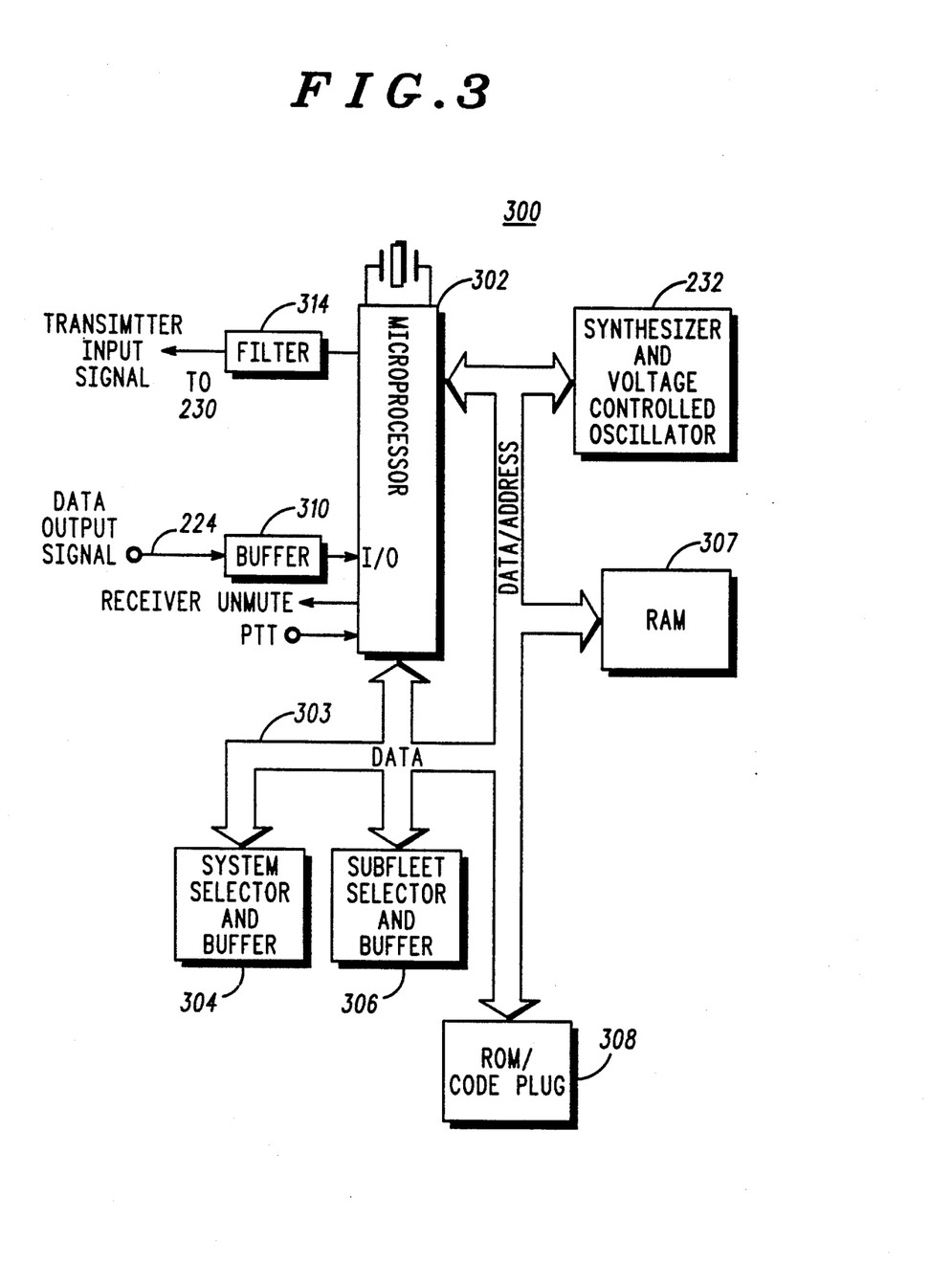
FIG. 3 is a schematic and block diagram of the processing portion of the receiver of FIG. 2.

Referring now to FIG. 3, there is shown a schematic and block diagram of the processing portion of the transceiver of FIG. 2. A microprocessor 302 provides both transceiver operational control functions as well as a number of data decoding and processing functions. The data signal 224 recovered by receiver 200 is coupled to microprocessor 302 through a buffer circuit 310. The microprocessor 302 is further coupled to an address and data bus 303 which couples the microprocessor 302 to the system and subfleet selector switch buffers 304 and 306. The address and data bus 303 is also coupled to the synthesizer and voltage controlled oscillator 232 of FIG. 2. In the operation of the present invention, microprocessor 302 decodes and generates data signals in accordance with a predetermined signalling scheme. The generated data signals are coupled to the transmitter input of synthesizer 232 through an adaptive filter 314. The circuit components described in FIG. 3 are well known and any of several readily available components may be used in accordance with the teaching of the present invention.

Figure 4A:
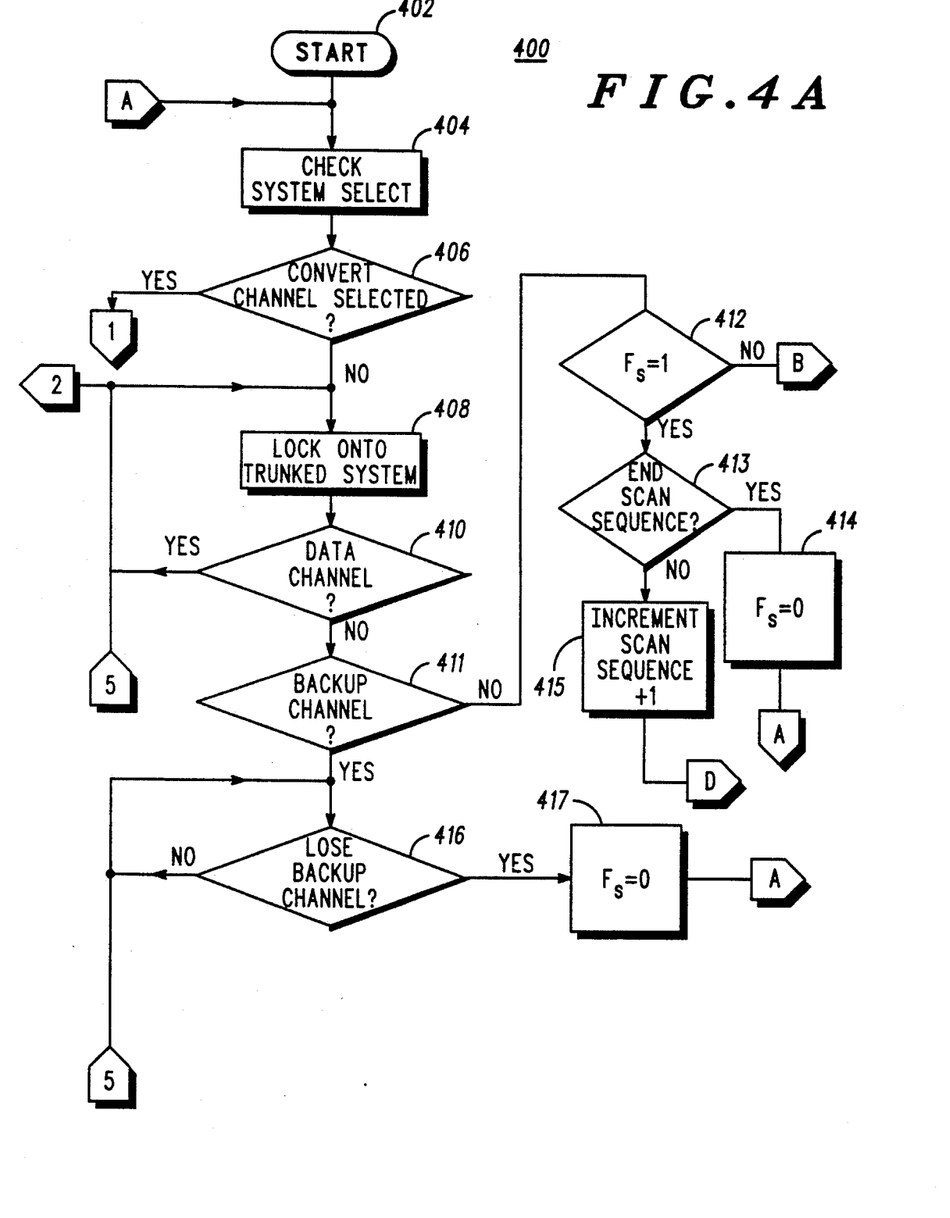
FIGS. 4a–c comprise a flow diagram detailing the step-by-step execution of the method of the preferred embodiment of the present invention.
Figure 4B:
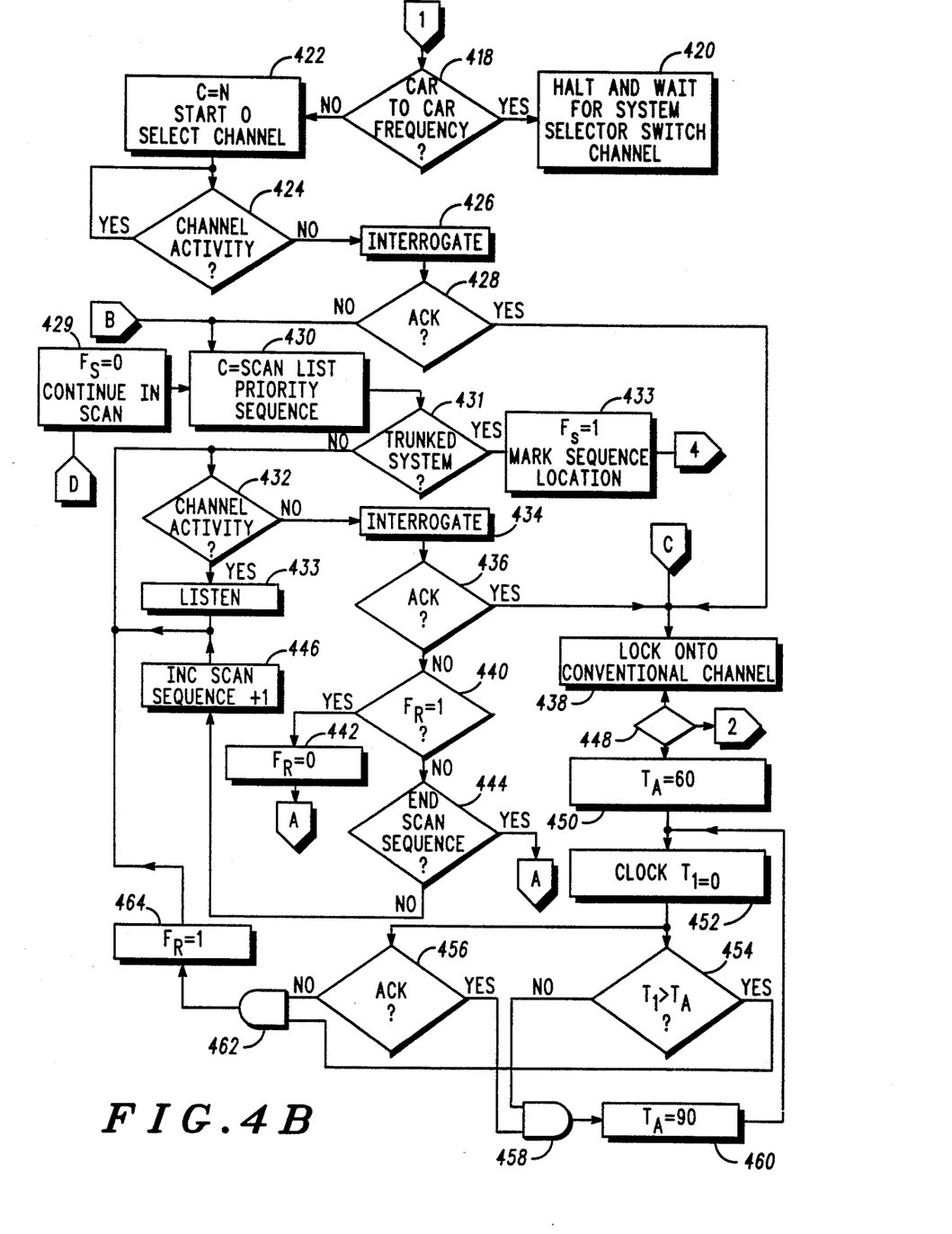
Figure 4C:
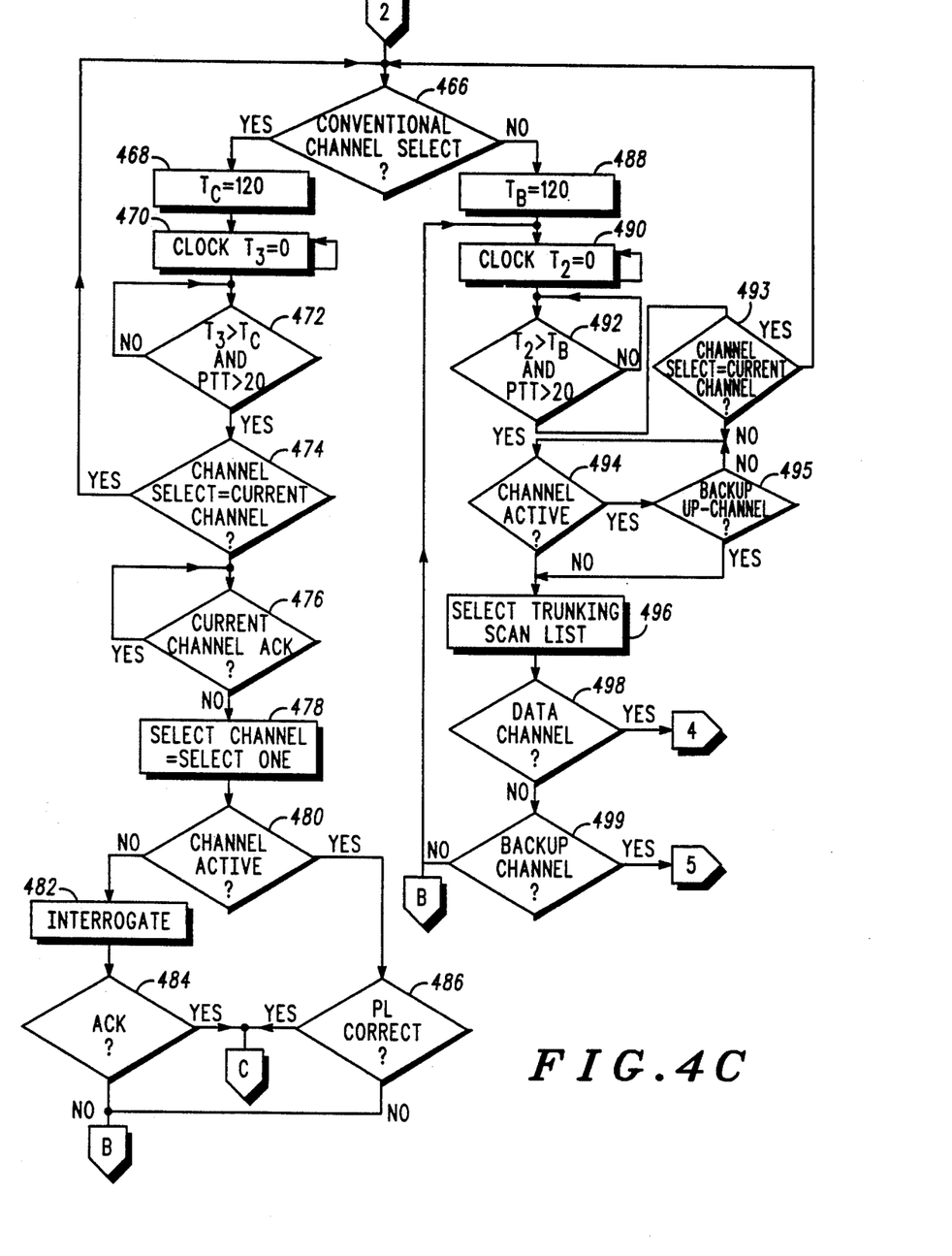

Referring now to FIG. 4, there is a flow diagram describing the automatic access method of the present invention. When the automatic selection process is enabled at 402, decision 406 examines the system switch to determine whether a conventional or trunked system has been requested. If the selector is set to a trunked system, item 408 provides the radio with a stored list of potential data channels which the radio is authorized to operate. Item 408 then causes the radio to scan potential data channels according to the stored list. If a data channel is detected, decision 410 examines the activity on the channel to determine whether it is a proper data channel. If a proper data channel has been detected, the radio will lock onto the data channel and operate in the trunked system. Failing to find a data channel decision 410 directs the radio to item 411 to search for a backup trunking channel. If a backup trunking channel is detected, the radio will remain there until decision 416 detects the loss of the data activity on the channel. If the backup data channel is lost, decision 416 causes the automatic mode to reset the scan flag and to restart at 402. If decision 411 did not find a backup trunking channel, the method of the present invention uses decision 412 to determine if the trunked system scan flag ($F_S$) is set to one. If the flag is set to one then decision 413 checks to see if the scan is complete. If the scan is complete, the flag is reset by 414 and the process is restarted. If the scan is not complete the scan list location is incremented by one, the flag is reset in 429 and control transfers back to 430 to continue the scan.

If at item 412 the trunking scan flag was not set, control is transfered to 430 to start the scan list from the beginning. Decision 431 examines the first system in the priority scan list and determines whether the system is trucked. If the system is trunked then item 433 sets the trunked scan flag ($F_S$) to one, stores the position of the system in the scan list and transfers control to item 408. If the system is non-trunked, control is transfered to item 432 to test for channel activity. If channel activity is not detected, item 434 will interrogate the repeater to determine whether the radio is within the operating area of the particular repeater. If channel activity is detected, item 433 allows the radio to receive on the appropriate channel but prevents the interrogation, 434, of the mobile relay until the channel activity has ceased. The decision 436 is based on whether the mobile relay acknowledges the interrogation with a valid response. If decision 436 detects a valid response, item 438 will be selected and the radio will temporarily operate on the conventional mobile relay system. At this moment, two concurrent timing sequences are initiated at process 448. While most microprossessors and microcomputers are capable of executing a single instruction at a time, techniques are well known for allowing a microprocessor to execute more than one process and provide essentially concurrent operation among several processes. The process initiated at item 450 provides a time keeping function. Item 450 sets the contents of an acknowledgment timer to a value which may be intergrally incorporated into the operating program or retrieved from the contents of memory which may be set according to user preference. This value would typically be on the order of 60 seconds. An alternate timing sequence begins with decision 466 and will be fully discussed below.

Item 452 provides a counter or clock register which is incremented once a second while the other portions of the present method are being executed. This leads to two decision blocks. Decision 454 examines items 450 and 452 and determines whether the time limit has been exceeded. Decision 456 determines whether an acknowledgment has been received during the time interval set by items 450 and 452. If the decision 454 has not detected that the interval has timed out and, decision 456 has decoded an acknowledgment, then the conclusion is that another user has entered the system and the value of the acknowledgment timer, 450, should be incremented to a higher value and the timer, 452, restarted at zero. This function is represented symbolically by AND gate 458 and item 460.

Should the timer decision 454 exceed the time interval set by items 450 and 452 and decision 456 has not decoded an acknowledgment, the radio must reinterrogate the mobile relay to continue its operation. The symbolic AND gate 462 activates item 464 under this condition. Item 464 sets a re-interrogation flag ($F_R$) and decision 432 is selected to determine whether there is any current channel activity. As noted above, if there is no current channel activity, item 434 will cause an interrogation to be sent. At this point, if decision 436 indicates an acknowledgment has been decoded, then the loop has been completed and the radio will continue to operate on the system, subject to the other timing sequences and the re-interrogation loop just completed.

If at decision 436 no acknowledgment was decoded, then decision 440 checks to see whether a re-interrogation is indicated that is, the flag $F_R$ equals one. If decision 440 determines that the flag has been set, then the radio clears the re-interrogation flag at item 442 by setting FR equal to zero and the process starts over again at 402. If decision 440 determines that the flag has not been set, then it is known that the radio has not found a channel yet and decision 444 is selected to determine whether the radio has exhausted the possibilities stored in the scan list. If the scan list has been exhausted, decision 444 causes the process to be started over at 402. If the scan list has not been exhausted, then the scan list is incremented by one at item 446, and the radio again starts the loop at decision 432, on the next channel in the sequence.

The other timing sequence initiated by process 448 begins with decision 466. Decision 466 is similar to decision 406 in that the system selector is reviewed to determine whether the operator requested a trunked or conventional system for their primary communications. If decision 466 determines that conventional communications have been requested, then the conventional retry timer 468 is set to a predetermined value, for example, 120 seconds. As with the timers described above, this value may be integrally incorporated into the operating program or alternatively be stored in a code plug or memory location which is read to determine the value of the retry interval. The timer formed by item 470, is incremented once per second until decision 472 indicates that the proper interval has occurred. This interval is the $T_c$ time interval ANDED with no ocurrence of push-to-talk for 20 seconds. If decision 474 determines that the radio is operating on the channel selected on the system selector, the decision loop is repeated. If the output of decision 474 determines that the radio is not operating on the channel selected on the system selector, and decision 476 determines that there is no channel activity, the radio will be programmed to the channel selected by the system selector by item 478. Decision 480 is selected to determine whether there is channel activity on the newly selected channel. If decision 480 detects activity, and decision 486 indicates the proper subaudible tone or data is present, the program will proceed to item 438 and lock onto the channel which is indicated on the system selector. If decision 486 indicates an improper subaudible tone or data, then the program will transfer to item 430 to start from the top of the search sequence. If the decision 480 determines that the channel is not active, then item 482 will generate an interrogation. If an acknowledgment is decoded by decision 484, then the radio will proceed to item 438. If an acknowledgment is not decoded by decision 484, then the program will transfer to item 430 which restarts the search from the top of the search scan list. When entry into block 430 was preceded by decisions 484, 486, or 499, the scan list is modified to place the last used channel above the scan list. This speeds-up the reaccess time. During the initial pass-through block 430, there was no last used channel and the process starts with the normal priority list.

If the decision 466 was no, then the radio should be retrying to reaccess the selected trunked communications system. Item 488 sets the trunking retry interval to 120 seconds. The timer interval is stored in a manner which is identical to the values of the timers described above The timer formed by item 490 is started and incremented once a second until decision 492 indicates that the time interval has elapsed. This interval is the $T_b$ time interval ANDED with no occurrence of push-to-talk for 20 seconds. If decision 493 determines that the radio is operating on the system selected by the system selector, the decision loop is repeated. If the output of decision 493 determines that the radio is not operating on the channel selected on the system selector then decision 494 checks for channel activity. If channel activity is not occuring on a backup channel, the system will wait until the activity ceases before transfering to item 496. If the backup data word is decoded, by item 495 the selection of item 496 will occur without delay. Item 496 will check the previously defined trunking sequence, and program the radio to operate on the trunked system according to the trunking sequence. Decision 498 transfers program control to item 408 if a data channel has been found. If the date channel sequence was not found, decision 498 selects decision 499 which looks for a backup channel. If no backup channel is found, decision 499 restarts the timer loop by setting 490 back to zero, and transfers control to 430. If decision 499 detects that a backup channel was found, then the program transfers to decision 416 which holds the radio on the backup channel until the backup channel identifying data word is lost. if the backup channel is lost. the program exits decision 416 where item 417 resets the trunking scan flag and the entire routine is started from the beginning, 402.

The final path possible exists if the decision 406 indicates that a conventional channel has been selected. If decision 406 indicates that a conventional channel has been requested, decision 418 determines whether the conventional selection is a simplex (car-to-car frequency). If decision 418 determines that a car-to-car frequency has been requested, then the automatic process must be halted and item 420 is selected, as there are no mobile relays in this configuration to respond with acknowledgments. The instructions executed by item 420 allow the radio to operate on the selected channel until the system selector is changed which restarts the program at 402. If decision 418 determines that a car-to-car frequency has not been requested, then item 422 will program the radio to the channel indicated on the system selector and decision 424 checks for channel activity. When there is no activity, decision 424 selects item 426 and an interrogation will be sent. If the decision 428 indicates that an acknowledgment was decoded, then the radio will lock onto that channel at item 438. If decision 428 determines that an acknowledgement was not successfully decoded, then item 430 will be selected and the conventional system scan process will be initiated.

In summary, a method and means for multi-system operation has been described. According to the principles of the present invention, a communication channel is established by searching for a communication channel on the selected trunked or non-trunked system, and remaining on that channel if one can be found. If the selected channel cannot be found, the mobile unit searches for an alternate system according to a prearranged scan list. The mobile unit then locks onto the alternate channel if the alternate non-trunked system responds with an acknowledgement when interrogated, or if the trunked system data channel is found. The mobile unit attempts to reestablish communications on the operator selected system on a periodic basis, and simultaneously attempts to be assigned a higher priority channel on the alternate communication system scan list if the operator selected system cannot be found, and the current alternate system cannot be reacquired. Accordingly, other uses and modifications will be obvious to one of ordinary skill in the art without departing from the spirit and scope of the principles of the present invention.

I claim:

1. A method of controlling a portable or mobile transceiver for automatically seeking an available communications system if a operator selected communication system is not available in an area having a plurality of trunked and non-trunked communications systems, said method comprising the steps of:
   (a) searching for a communication channel on an operator selected trunked or non-trunked communication system, and remaining on that system if it can be found;
   (b) searching for an alternate channel on another trunked or non-trunked communication system according to a prearranged priority scan list, if said operator selected system cannot be found;
   (c) locking onto an alternate non-trunked system if the alternate non-trunked system responds with an acknowledgement when interrogated, or locking onto a trunked system upon detecting a trunked system data channel;
   (d) periodically attempting to reestablish communications on the operator selected system system on a periodic basis; and
   (e) periodically searching for a higher priority trunked or non-trunked system according to said priority scan list if a channel on the operator selected system cannot be found.

2. A method of controlling a portable or mobile transceiver for automatically seeking an available communications system if a operator selected communication system is not available in an area having a plurality of trunked and non-trunked communications systems, said method comprising the steps of:
   (a) searching for a communication channel on an operator selected trunked or non-trunked communication system, and remaining on that system if it can be found;
   (b) searching for an alternate channel on another trunked or non-trunked communication system according to a prearranged priority scan list, if said operator selected system cannot be found;

(c) locking onto an alternate non-trunked system if the alternate non-trunked system responds with an acknowledgement when interrogated, or locking onto a trunked system upon detecting a trunked system data channel;

(d) periodically attempting to reestablish communications on the operator selected system system on a periodic basis;

(e) returning to the last assigned alternative system is said operator selected system cannot be found; and (f) periodically searching for a higher priority trunked or non-trunked system according to said priority scan list if a channel on the last assigned alternative system cannot be found.

3. A method of controlling a portable or mobile transceiver for automatically seeking an available communications system if a operator selected communication system is not available in an area having a plurality of trunked and non-trunked communications systems, said method comprising the steps of:

(a) searching for a communication channel on an operator selected trunked or non-trunked communication system, and remaining on that system if it can be found;

(b) searching for an alternate channel on another trunked or non-trunked communication system according to a prearranged priority scan list, if said operator selected system cannot be found;

(c) locking onto an alternate non-trunked system if the alternate non-trunked system responds with an acknowledgement when interrogated, or locking onto a trunked system upon detecting a trunked system data channel;

(d) remaining on an alternate trunked or non-trunked communication system for a predetermined period of time if said portable or mobile transceiver transmits on that system;

(e) periodically attempting to reestablish communications on the operator selected system system on a periodic basis; and (f) periodically searching for a higher priority trunked or non-trunked system according to said priority scan list if a channel on the operator selected system cannot be found.

4. A method of controlling a portable or mobile transceiver for automatically seeking an available communications system if a operator selected communication system is not available in an area having a plurality of trunked and non-trunked communications systems, said method comprising the steps of:

(a) searching for a communication channel on an operator selected trunked or non-trunked communication system, and remaining on that system if it can be found;

(b) searching for an alternate channel on another trunked or non-trunked communication system according to a prearranged priority scan list, if said operator selected system cannot be found;

(c) locking onto an alternate non-trunked system if the alternate non-trunked system responds with an acknowledgement when interrogated, or locking onto a trunked system upon detecting a trunked system data channel;

(d) remaining on an alternate trunked or non-trunked communication system for a predetermined period of time if said portable or mobile transceiver transmits on that system;

(e) periodically attempting to reestablish communications on the operator selected system on a periodic basis; and (f) returning to the last assigned alternative system is said operator selected system cannot be found; and (g) periodically searching for a higher priority trunked or non-trunked system according to said priority scan list if a channel on the last assigned alternative system cannot be found.

5. A transceiver which is compatible with both trunked and non-trunked communication systems, said transceiver comprised of:

(a) means for enabling an operator activated automatic mode in said transceiver wherein said automatic mode provides a means to request trunked or non-trunked service;

(b) means for determining whether trunked or non-trunked service has been requested;

(c) means for searching and detecting available trunked channels assigned to the particular transceiver;

(d) means for locking onto an available data channel, if trunked service has been requested, if data activity is present, and if a valid system I.D. has been detected, (e) means for interrogating available non-trunked systems according to a prearranged priority scan list;

(f) means for locking onto a non-trunked system if that system responds with an acknowledgement signal when interrogated;

(g) means for periodically searching for channel activity on trunked system data channels;

(h) means for attempting to reestablish communication with the operator selected trunked or non-trunked communication system on a predetermined periodic basis;

(i) means for periodically attempting to reestablish communication on a higher priority system if not operating on an operator requested system, unless the alternate system can be reacquired; and (j) means to delay the periodic attempt to reestablish communication on the operator selected system or a higher priority system if the radio has recently been transmitting.

* * * * *